(12) United States Patent
Doerr et al.

(10) Patent No.: US 12,210,887 B1
(45) Date of Patent: Jan. 28, 2025

(54) TECHNIQUES TO SUPPORT DYNAMIC CONTEXT SHARING

(71) Applicant: OpenFin Inc., New York, NY (US)

(72) Inventors: Chuck Doerr, New York, NY (US); Gavin Lauchlan, Ayr (GB); Steven Mocarski, Yardley, PA (US)

(73) Assignee: HERE ENTERPRISE INC., New York, NY (US)

( * ) Notice: Subject to any disclaimer, the term of this patent is extended or adjusted under 35 U.S.C. 154(b) by 0 days.

(21) Appl. No.: 18/733,194

(22) Filed: Jun. 4, 2024

(51) Int. Cl.
*G06F 3/048* (2013.01)
*G06F 3/0481* (2022.01)
*G06F 3/04847* (2022.01)
*G06F 9/451* (2018.01)

(52) U.S. Cl.
CPC ............ *G06F 9/451* (2018.02); *G06F 3/0481* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 9,843,626 | B2* | 12/2017 | Trinh | G06Q 10/107 |
| 10,198,144 | B2* | 2/2019 | Munoz | G06F 3/0482 |
| 2019/0095255 | A1* | 3/2019 | Anima | G06F 40/18 |
| 2022/0050578 | A1* | 2/2022 | Waldman | G06F 3/0481 |
| 2022/0397995 | A1* | 12/2022 | Misra | G06F 3/0483 |
| 2023/0055241 | A1* | 2/2023 | Zionpour | G06F 16/958 |

* cited by examiner

*Primary Examiner* — Thanh T Vu
(74) *Attorney, Agent, or Firm* — Womble Bond Dickinson (US) LLP

(57) ABSTRACT

User interface (UI) configuration data may be determined for a first view of a composite UI may be determined. The first view of the composite UI may include a first UI displayed in a first window and a second UI displayed in a second window. The UI configuration data may indicate the first UI interfaces with a first resource and the second UI interfaces with a second resource. A processing device may generate a sharing set in a context groups mapping based on the UI configuration data. The sharing set may include the first resource and the second resource. The contextual data may be shared, via a trans-resource messaging bus, between the first resource and the second resource based on the sharing set.

20 Claims, 11 Drawing Sheets

602

```
┌─────────────────────────────────────────────────────────────────┐
│ DETERMINING USER INTERFACE (UI) CONFIGURATION DATA FOR A FIRST VIEW OF A │
│ COMPOSITE UI, THE FIRST VIEW OF THE COMPOSITE UI COMPRISING A FIRST UI   │
│ DISPLAYED IN A FIRST WINDOW AND A SECOND UI DISPLAYED IN A SECOND WINDOW,│
│ AND THE UI CONFIGURATION DATA INDICATING THE FIRST UI INTERFACES WITH A FIRST │
│ RESOURCE AND THE SECOND UI INTERFACES WITH A SECOND RESOURCE     │
│                              610                                 │
└─────────────────────────────────────────────────────────────────┘
                                 │
                                 ▼
┌─────────────────────────────────────────────────────────────────┐
│ GENERATING, BY A PROCESSING DEVICE, A SHARING SET IN A CONTEXT GROUPS │
│ MAPPING BASED ON THE UI CONFIGURATION DATA, THE SHARING SET INCLUDING THE │
│             FIRST RESOURCE AND THE SECOND RESOURCE              │
│                              620                                 │
└─────────────────────────────────────────────────────────────────┘
                                 │
                                 ▼
┌─────────────────────────────────────────────────────────────────┐
│ SHARING, VIA A TRANS-RESOURCE MESSAGING BUS, CONTEXTUAL DATA BETWEEN THE │
│      FIRST RESOURCE AND THE SECOND RESOURCE BASED ON THE SHARING SET    │
│                              630                                 │
└─────────────────────────────────────────────────────────────────┘
```

FIG. 6

TECHNIQUES TO SUPPORT DYNAMIC CONTEXT SHARING

TECHNICAL FIELD

This disclosure relates generally to interprogram communication and more particularly to techniques to support dynamic context sharing between resources accessible via a composite user interface (UI) of a resource interface application (RIA).

BACKGROUND

In the field of human-computer interaction, a user interface (UI) is a space where interactions between users and computers occur. Typically, the goal of the interactions is to allow effective operation and control of the computer from the user end to perform a task, while the computer simultaneously feeds back information that aids the decision making process of the user. In some scenarios, a user may need various pieces of information from different resources (e.g., applications, data stores, etc.) to perform a task. Accordingly, a user may utilize multiple UIs to interact with multiple resources to acquire the various pieces of information to perform a task. Oftentimes, the various pieces of information may include contextual data. Contextual data may refer to, or include, the information and circumstances that form the setting for an event, statement, or idea. For example, a user may use a first UI to determine first contextual data including identifying information of a client associated with a task from a first application. Next, the user may have to provide the first contextual data to a second application via a second UI to acquire second contextual data including contact information for the client. The user may then have to provide the second contextual data to a third application via a third UI to send a message to the client.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

To easily identify the discussion of any particular element or act, the most significant digit or digits in a reference number refer to the figure number in which that element is first introduced.

FIG. 6 illustrates a flow diagram of a method for supporting dynamic context sharing according to some embodiments of the present disclosure.

DETAILED DESCRIPTION

Figure 1:
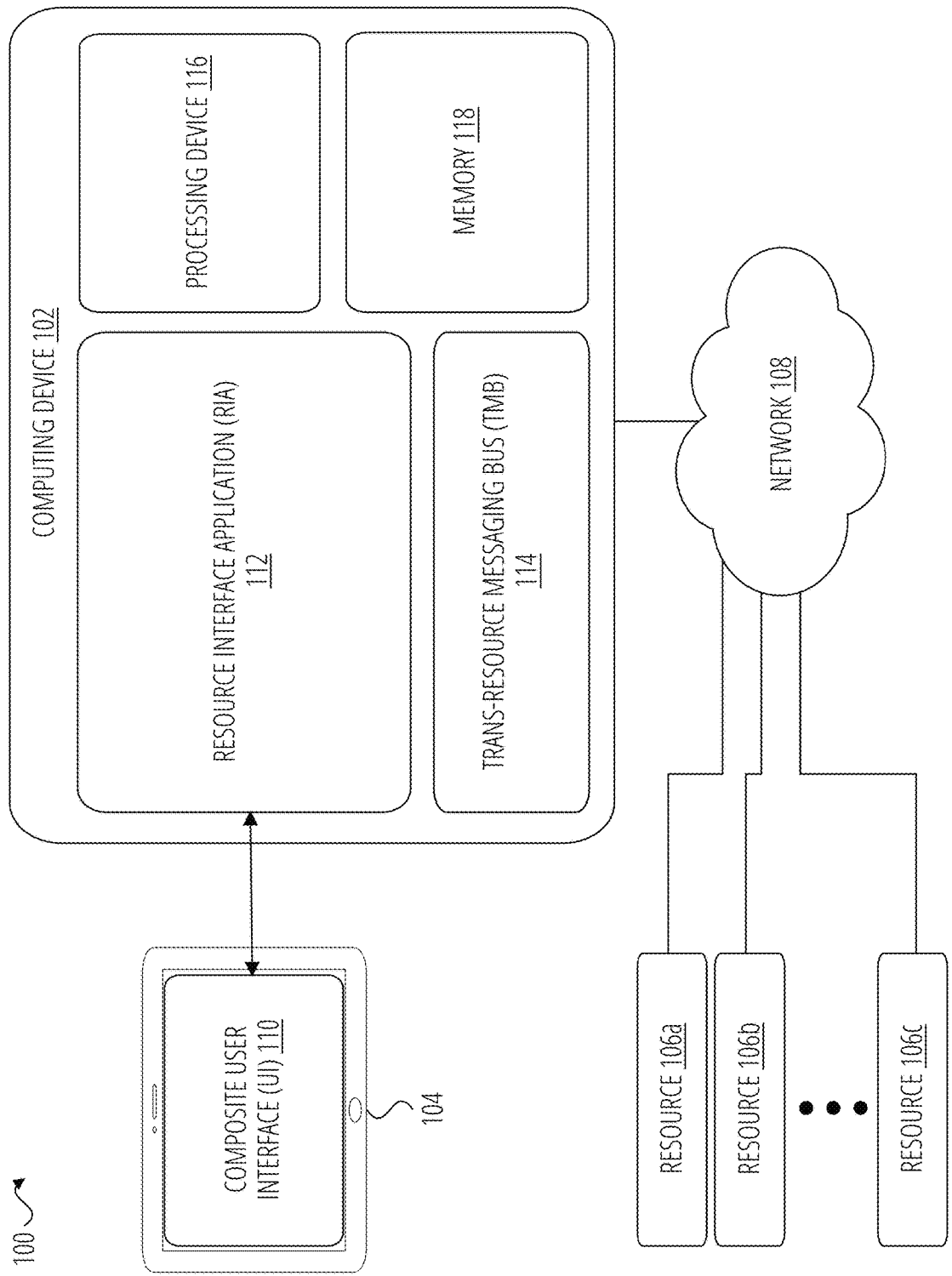
FIG. 1 illustrates an exemplary operating environment for supporting dynamic context sharing with a resource interface application (RIA) according to some embodiments of the present disclosure.

The following description sets forth numerous specific details such as examples of specific systems, components, methods, and so forth, in order to provide a good understanding of various embodiments of the techniques described herein for dynamic context sharing between various resources accessible via a composite UI of a resource interface application (RIA). It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Context sharing generally refer to the ability to provide data regarding a current state, circumstance, setting, or the like from a first resource to a second resource. Oftentimes, the data is provided to the second resource for the benefit of the second resource. For example, information regarding a current topic of interest may be passed from a first resource to a second resource to enable the second resource to acquire and/or provide additional details on the current topic of interest. However, existing context sharing techniques rely on expertise and/or manually intensive procedures. For example, a user existing context sharing techniques may require a user to copy and paste data from an interface of a first resource into an interface of a second resource. This leads to time-consuming and inefficient techniques for context sharing, especially when context data needs to be shared with a plurality of resources. In another example, different resources may be configured to share context data between themselves. However, expertise and manually intensive procedures are required to configure and reconfigure which resources share contextual data between themselves. Adding further complexity, while it can be beneficial for some resources to share contextual data, it can also be detrimental if other resources share contextual data. For example, it may be detrimental for a confidential resource to share contextual data with a publicly accessible resource. These limitations can drastically reduce the accessibility, usability, and capabilities of context sharing techniques, contributing to inefficient systems and poor user experiences.

Accordingly, many embodiments disclosed hereby provide various techniques and features for supporting dynamic context sharing between various resources, such as applications, processes, data stores, and the like. Some embodiments are particularly directed to sharing contextual data between different resources corresponding to different interfaces displayed in a composite UI of a resource interface application (e.g., a browser). For example, resources corresponding to different interfaces displayed in a first tab of a composite UI may automatically be configured to share contextual data and resources corresponding to different interfaces displayed in a second tab of the composite UI may automatically be configured to share contextual data. In many embodiments, different resources may be grouped into sharing sets, such as based on a view or layout of the composite UI. In many such embodiments, sharing sets may be dynamically updated in response to changes to a view or layout of the composite UI. In several embodiments, the contextual data is shared via a trans-resource messaging bus (TMB). For example, data objects comprising contextual data may be published to the TMB. In some such examples, resources in a sharing set may be notified when data objects associated with a resource in the sharing set is published. In various embodiments, resources in a sharing set may be subscribed to one or more event streaming topics associated with the sharing set. Accordingly, embodiments described hereby provide techniques and features for supporting dynamic context sharing between resources in an efficient, accurate, and customizable manner.

In several embodiments, these techniques and features may be implemented via a composite UI of a resource interface application, such as to provide an improved user interface. For example, the composite UI may be readily configurable by users to cause contextual data to be quickly and efficiently shared between selectable groups of resources. In various embodiments, the contextual data shared between resources may include or correspond to content displayed in the UI of one or more of the resources. In many embodiments, data may be populated in a first UI displayed in a first window of a composite UI based on contextual data shared between the first resource and a second resource. For example, a search bar for a customer information application may be populated with a unique identifier of a customer based on the customer being looked up in an incident tracking application. In several embodiments, performance of a process by a first resource may be triggered based on contextual data shared between the first resource and a second resource. Continuing with the previous example, details on the customer may be automatically retrieved and displayed on the interface of the customer information application in response to the customer being looked up in the incident tracking application.

In these and other ways, components/techniques described hereby may provide many technical advantages for supporting dynamic context sharing. For example, context sharing between different sets of resources can be reliably, intuitively, and efficiently implemented. Further, the techniques and features described hereby provide particular ways of programming or designing software to create dynamic context sharing. Further, the techniques and features provide a specific interface and implementation for navigating complex interactions with a multitude of resources in an intuitive and efficient manner using techniques unique to computers, such as a trans-resource messaging bus, composite UIs, sharing sets, event streaming, for example. Therefore, the computer-based techniques of the current disclosure improve the functioning of context sharing techniques, resulting in better performance, improved capabilities, and improved user experiences as compared to conventional approaches. Accordingly, embodiments disclosed hereby can be practically utilized to improve the functioning of a computer and/or to improve a variety of technical fields including context sharing, composite UIs, resource interface applications, data busses, user experience, and human-machine interfaces.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 illustrates an operating environment 100 for supporting dynamic context sharing according to some embodiments. Operating environment 100 includes a computing device 102, an interface device 104, a plurality of resources 106a, 106b, 106c (collectively referred to as resources 106), and a network 108. The computing device 102 includes a resource interface application (RIA) 112, a trans-resource messaging bus (TMB) 114, a processing device 116, and a memory 118. The interface device 104 includes a composite UI 110. In various embodiments, the RIA 112 may facilitate access to a plurality of resources (e.g., resources 106) via a composite UI 110. In many embodiments, the RIA 112 may operate in conjunction with the TMB 114 to support context sharing among various portions or sets of the resources 106 being accessed or utilized by the RIA 112. In many such embodiments, the context sharing may be dynamically updated based on the layout or configuration of the composite UI 110. One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, the interface device 104 may be included in the computing device 102 without departing from the scope of this disclosure. In another example, one or more of the resources 106 may be located in the computing device 102 without departing from the scope of this disclosure. In yet another example, the TMB 114 may be external to the computing device 102 and/or connected via network 108 without departing from the scope of this disclosure. Embodiments are not limited in this context.

Generally, the RIA 112 may generate the composite UI 110 on the interface device 104. The composite UI 110 includes a layout including a collection of display elements (e.g., tabs, windows, and resource interfaces displaying content). The layout and collection of display elements may be configured in a variety of manners without departing from the scope of this disclosure. For example, the composite UI 110 may include an arbitrary layout and collection of display elements that is only limited by the capabilities of the underlying hardware. In many embodiments, the layout and collection of display elements may be configured by a user or an administrator.

In many embodiments, the RIA 112 may be configured to automatically cause various groupings of resources corresponding to resource interfaces included in composite UI 110 to share contextual data, such as via TMB 114. In many such embodiments, the layout and collection of display elements in the composite UI 110 may be utilized to group resources into sharing sets. For example, resources corresponding to resource interfaces included in a primary tab (see e.g., FIG. 2) may be utilized to determine sharing sets.

The resources 106 may include or refer to various applications, web applications, portals, widgets, gadgets, and the like. More generally, a resource may include a computing entity that may provide or receive data via the composite UI 110. In the illustrated embodiment, the resources 106 are communicatively coupled with the computing device 102 via a network, such as the internet. However, the resources may be communicatively coupled to the computing device 102 via any means without departing from the scope of this disclosure. For example, one or more resources may be included in the computing device 102.

It should be noted that although a single processing device 116 and a single memory 118 are depicted in the computing device 102 of FIG. 1 for simplicity, other embodiments may include multiple processing devices, storage devices, or devices. processing device 116 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. processing device 116 may also include one or more special-purpose processing devices such as an application specific integrated circuit (ASIC), a field programmable gate array (FPGA), a digital signal processor (DSP), network processor, or the like. Further details regarding supporting dynamic context sharing will be discussed below.

Figure 2:
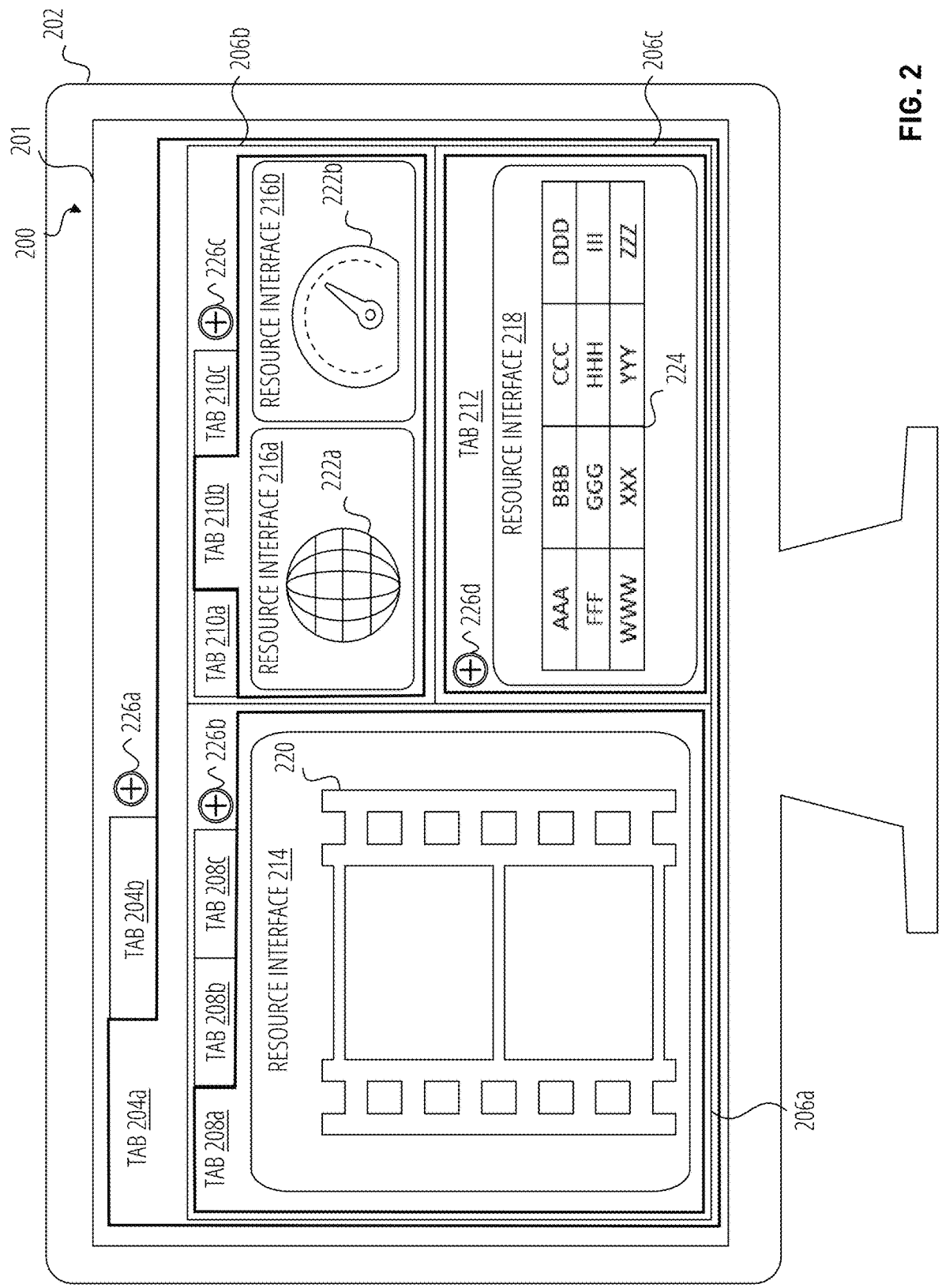
FIG. 2 illustrates an exemplary view of a composite UI according to some embodiments of the present disclosure.

FIG. 2 illustrates an exemplary view 200 of a composite UI 201 according to some embodiments. In the illustrated embodiment, the composite UI 201 is presented via a display 202. In various embodiments, the composite UI 201 may be generated by a resource interface application (e.g., RIA 112), such as an enterprise browser application. The composite UI 201 may include a collection of tabs, windows, and resource interfaces displaying content. In embodiments described hereby, the resources corresponding to the various resource interfaces may be grouped into sharing sets, such as based on the tab of the composite UI 201 the corresponding resource interface (also referred to as a UI) is currently included in. Further, resources in a sharing set may be automatically configured, such as by the RIA, to share contextual data with each other via a TMB. One or more components of FIG. 2 may be the same or similar to one or more other components disclosed hereby. For example, the view 200 of composite UI 201 may be the same or similar to a view of the composite UI 110. Further, aspects discussed with respect to various components in FIG. 2 may be implemented by one or more other components from one or more other embodiments without departing from the scope of this disclosure. Embodiments are not limited in this context.

The layout and collection of the tabs, windows, and resource interfaces in a view of composite UI may be dynamically added, removed, modified, moved, sized, configured, and customized by users to produce different composite UI views, subject to the capabilities of the underlying hardware. More generally, a view of a composite UI may refer to the current collection and layout of the tabs, windows, and resource interfaces of the composite UI. In the illustrated embodiment, the view 200 of composite UI 201 includes first and second tabs 204a, 204b (collectively referred to as tabs 204) and UI element 226a. The UI element 226a may be utilized to add additional tabs. The tabs 204 may be referred to as primary tabs. In view 200, the first tab 204a is displayed and the second tab 204b is positioned behind the first tab 204a. Selection of the second tab 204b, such as based on user input, may bring the second tab 204b to the top with the first tab 204a being positioned behind the second tab 204b. Other tabs, such as tabs 208a, 208b, 208c may operate in the same or similar manner.

The first tab 204a includes first, second, and third windows 206a, 206b, 206c (collectively referred to as windows 206). The first window 206a includes first, second, and third tabs 208a, 208b, 208c (collectively referred to as tabs 208) and UI element 226b. The first tab 208a is displayed in view 200 of composite UI 201 and includes a resource interface 214 displaying content 220. The tabs 208b, 208c may include one or more additional resource interfaces displaying content. The second window 206b includes first, second, and third tabs 210a, 210b, 210c (collectively referred to as tabs 210) and UI element 226c. The second tab 208c is displayed in view 200 of composite UI 201 and includes a first resource interface 216a displaying content 222a and a second resource interface 216b displaying content 222b. The tabs 210a, 210c may include one or more additional resource interfaces displaying content. The third window 206c includes tab 212 and UI element 226d. The tab 212 is displayed in view 200 of composite UI 201 and includes resource interface 218 displaying content 224. The UI elements 226b, 226c, 226d may be the same or similar to UI element 226a and may be utilized to add additional tabs. The tabs 208, 210, 212 may be referred to as subtabs. More generally, tabs included in a primary tab (e.g., tab 204a) may be referred to as subtabs.

As described in more detail below, a set of resources for sharing contextual data, referred to as a sharing set, may be determined based on the collection of resource interfaces included in a primary tab. For example, each resource having a UI included in a primary tab may form a sharing set. Further, resources in a sharing set may be automatically configured to share contextual data, such as via a TMB. For example, resources corresponding to resource interfaces 214, 216a, 216b, 212 and any other resources corresponding to hidden resource interfaces (e.g., resource interfaces of tabs 208b, 208c, 210a, 210c) may automatically be configured to share contextual data. However, other configurations may be utilized without departing from the scope of this disclosure. For example, sharing sets may be determined based on resource interfaces included in windows or subtabs.

Figure 3:
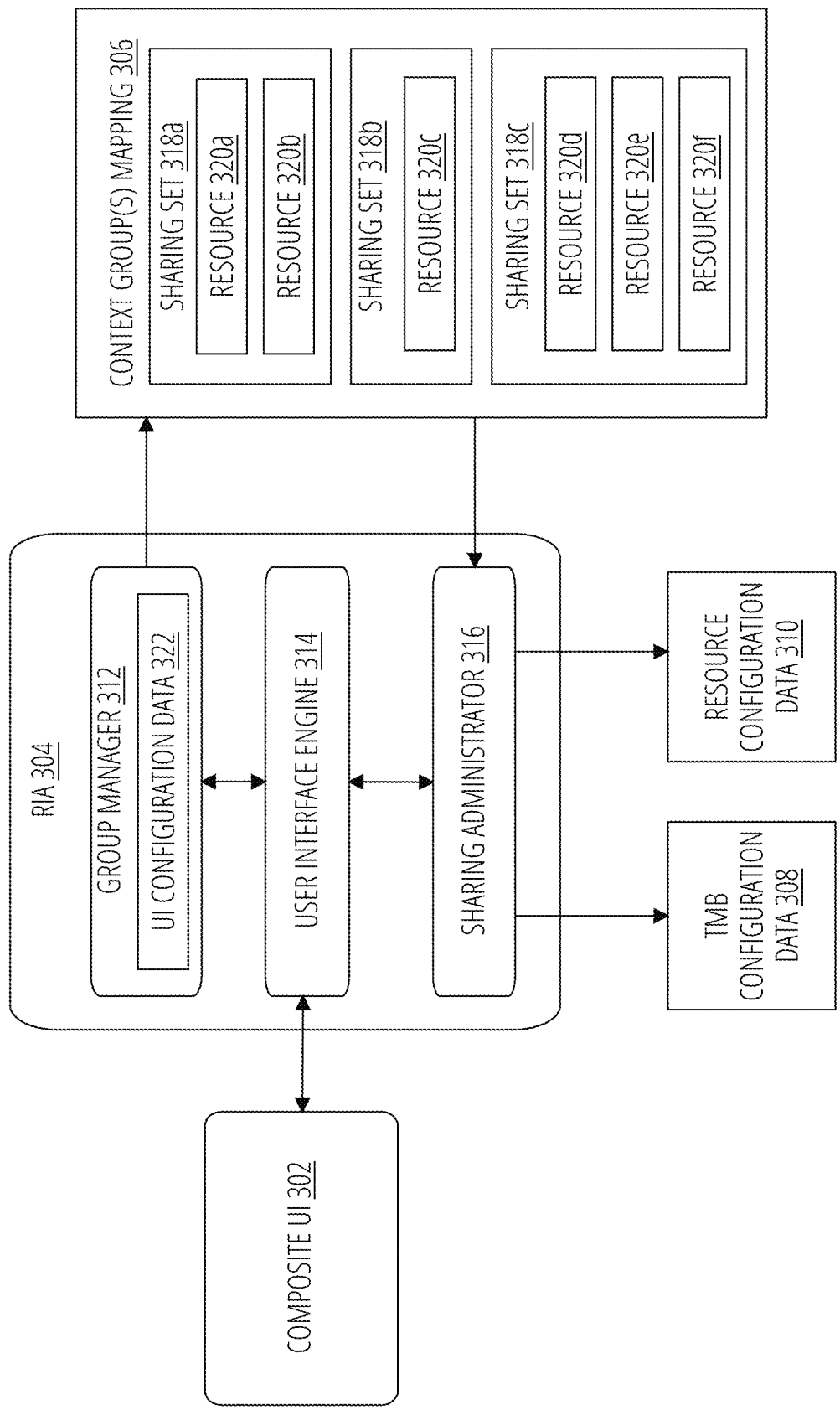
FIG. 3 illustrates various aspects of an RIA according to some embodiments of the present disclosure.

FIG. 3 illustrates various aspects of an RIA 304 according to some embodiments. The illustrated embodiment includes a composite UI 302, the RIA 304, a context groups mapping 306, TMB configuration data 308, and resource configuration data 310. The RIA 304 includes a group manager 312, a user interface engine 314, and a sharing administrator 316. The context groups mapping 306 includes one or more sharing sets with one or more resources. In the illustrated embodiments, the context groups mapping 306 includes a first sharing set 318a with resources 320a, 320b, a second sharing set 318b with resource 320c, and a third sharing set 318c with resources 320d, 320e, 320f. In various embodiments, the RIA 304 operates to generate context groups mapping 306 based UI configuration data 322, which may be determined based on the current layout and contents of the composite UI 302. In various such embodiments, the RIA 304 may generate TMB configuration data 308 and/or resource configuration data 310 based on the sharing sets in context groups mapping 306. The TMB configuration data 308 and/or resource configuration data 310 may be utilized to configure and implement context sharing between the different resources. One or more components of FIG. 3 may be the same or similar to one or more other components disclosed hereby. For example, RIA 304 may be the same or similar to RIA 112. In another example, composite UI 302 may be the same or similar to composite UI 201. Further, aspects discussed with respect to various components in FIG. 3 may be implemented by one or more other components from one or more other embodiments without departing from the scope of this disclosure. For example, one or more functionalities of components of RIA 304 may be implemented by components separate from RIA 304 without departing from the scope of this disclosure. Embodiments are not limited in this context.

The user interface engine 314 of RIA 304 may operate to generate the composite UI 302 on a display, such as based on user input. In various embodiments, the group manager 312 may interact with the user interface engine 314 to determine UI configuration data 322 based on the layout and contents of the composite UI 302. For example, each time the layout or components of composite UI 302 change, the group manager 312 may determine UI configuration data 322. In some embodiments, the user interface engine 314 may provide the group manager 312 with UI configuration data 322 each time the layout or components of composite UI 302 change. In other embodiments, the group manager 312 may monitor activity of the composite UI 302 and generate UI configuration data 322 in response to changes. In several embodiments, the RIA 304 may include a browser application. In many embodiments, the RIA 304 may provide the ability to run multiple web contexts concurrently. In some embodiments a different web context may correspond to one or more windows, tabs, resource interfaces, or the like in the composite UI 110. Further, the data from or describing the various web contexts may be shared using the techniques disclosed hereby.

The UI configuration data 322 may capture the current layout and contents of the composite UI 302. For example, UI configuration data 322 may indicate that a first UI that interfaces with resource 320a and a second UI that interfaces with resource 320b are included in a first primary tab, a third UI that interfaces with resource 320c is included in a second primary tab, and a fourth UI that interfaces with resource 320d, a fifth UI that interfaces with resource 320e, and a sixth UI that interfaces with resource 320f are included in a third primary tab. In some embodiments, the UI configuration data 322 may be utilized by group manager 312 to generate context groups mapping 306 with sharing sets 318a, 318b, 318c. For example, sharing set 318a may be generated in response to determining the first primary tab of composite UI 302 includes the first UI that interfaces with resource 320a and the second UI that interfaces with resource 320b. In another example, sharing set 318b may be generated in response to determining the second primary tab of composite UI 302 includes the third UI that interfaces with resource 320c. In yet another example, sharing set 318c may be generated in response to determining the third primary tab of composite UI 302 includes the fourth UI that interfaces with resource 320d, the fifth UI that interfaces with resource 320e, and the sixth UI that interfaces with resource 320f.

In various embodiments, the sharing administrator 316 may utilize the sharing sets in context groups mapping 306 to generate TMB configuration data 308 and/or resource configuration data 310. In various such embodiments, the TMB configuration data 308 may be utilized to configure the trans-resource messaging bus to support sharing of contextual data between resources included in the various sharing sets. Further, the resource configuration data 310 may be utilized to configure that various resources to support sharing of contextual data between other resources in the sharing set. For example, TMB configuration data 308 may be utilized to create and/or configure topics in the TMB and the resource configuration data 310 may be utilized to subscribe resources to the appropriate topics in the TMB and/or cause events to be published to the appropriate topics. More generally, in some embodiments, event streaming may be implemented, such as via the TMB to support dynamic context sharing between resources. In one example, a topic may be created for each resource in a sharing set and each of the other resources in the sharing set may be subscribed to each topic associated with the other resources in the sharing set. Alternatively, or additionally, the sharing administrator 316 may perform one or more aspects of the configuring, publishing, receiving, and/or distributing of contextual data itself.

Figure 4:
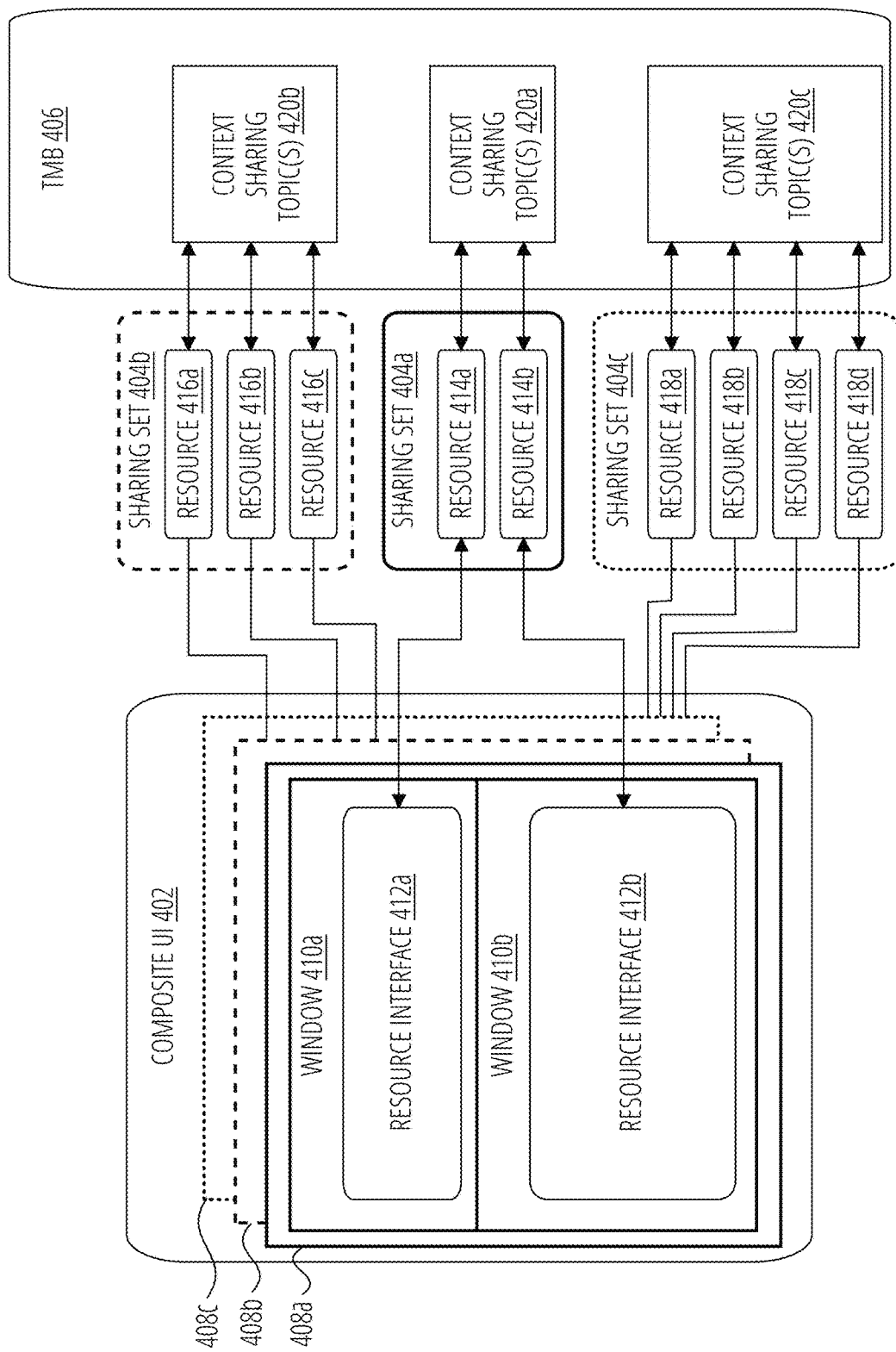
FIG. 4 illustrates various aspects of context sharing according to some embodiments of the present disclosure.

FIG. 4 illustrates various aspects of context sharing according to some embodiments. The illustrated embodiment includes a composite UI 402, a first sharing set 404a, a second sharing set 404b, a third sharing set 404c, and a TMB 406. The composite UI 402 includes a first tab 408a, a second tab 408b, and a third tab 408c. The sharing set 404a includes first and second resources 414a, 414b (collectively referred to as resources 414). The sharing set 404b includes first, second, and third resources 416a, 416b, 416c (collectively referred to as resources 416). The sharing set 404c includes first, second, third, and fourth resources 418a, 418b, 418c, 418d (collectively referred to as resources 418. The TMB 406 includes first, second, and third sets of one or more context sharing topics 420a. 420b, 420c. One or more components of FIG. 4 may be the same or similar to one or more other components disclosed hereby. For example, sharing set 404a may be the same or similar to sharing set 318a. In another example, TMB 406 may be the same or similar to TMB 114. Further, aspects discussed with respect to various components in FIG. 4 may be implemented by one or more other components from one or more other embodiments without departing from the scope of this disclosure. For example, context sharing may be facilitated between resources in a sharing set without utilizing context sharing topics and/or TMB 406 without departing from the scope of this disclosure. Embodiments are not limited in this context.

Referring back to composite UI 402, the first tab 408a is displayed on top and includes a first window 206a with a first resource interface 412a that corresponds to a first resource 414a in sharing set 404a and a second window 206b with a second resource interface 412b that corresponds to a second resource 414b in sharing set 404a. The second tab 408b is positioned behind the first tab 408a and includes one or more windows and/or one or more tabs including first, second, and third resource interfaces (not shown) that correspond to resources 416a, 416b, 416c of sharing set 404b, respectively. The third tab 408c is positioned behind the first and second tabs 408a, 408b and includes one or more windows and/or one or more tabs including first, second, third, and fourth resource interfaces (not shown) that correspond to resources 418a, 418b, 418c, 418d of sharing set 404c, respectively.

The TMB 406 includes first, second, and third sets of one or more context sharing topics 420a. 420b, 420c that facilitate the sharing of contextual data among resources in a sharing set. For example, context sharing topics 420a may include a topic corresponding to the sharing set 404a and each resource in the sharing set 404a may be subscribed to the topic. Accordingly, when contextual data is identified for sharing set 404a via the composite UI 402, an event comprising the contextual data may be published to context sharing topics 420a and each of the resources in the sharing set 404a may be notified and/or provided with the contextual data. In various embodiments, the contextual data may be provided in the form of a data object, such as a JavaScript Object Notation (JSON©) object. In various such embodiments, the data object may have a specific format or type, referred to as a context type JSON object. In one embodiment, the data object may utilize the following format.

```
{
    contextType: "Sting identifier"
    . . .
}
```

Figure 5A:
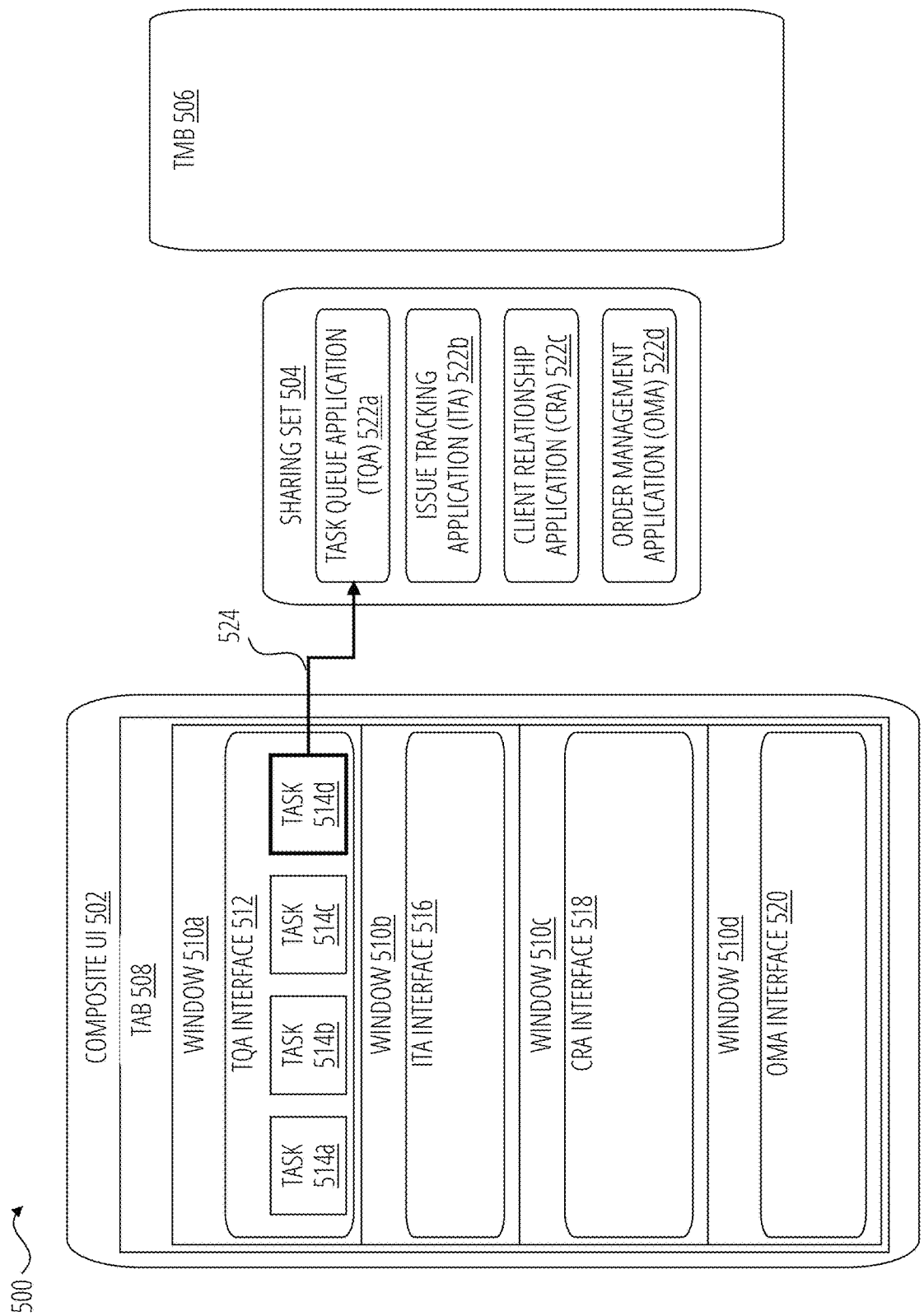
FIGS. 5A-5C illustrate a process flow for sharing contextual data according to some embodiments of the present disclosure.
Figure 5B:
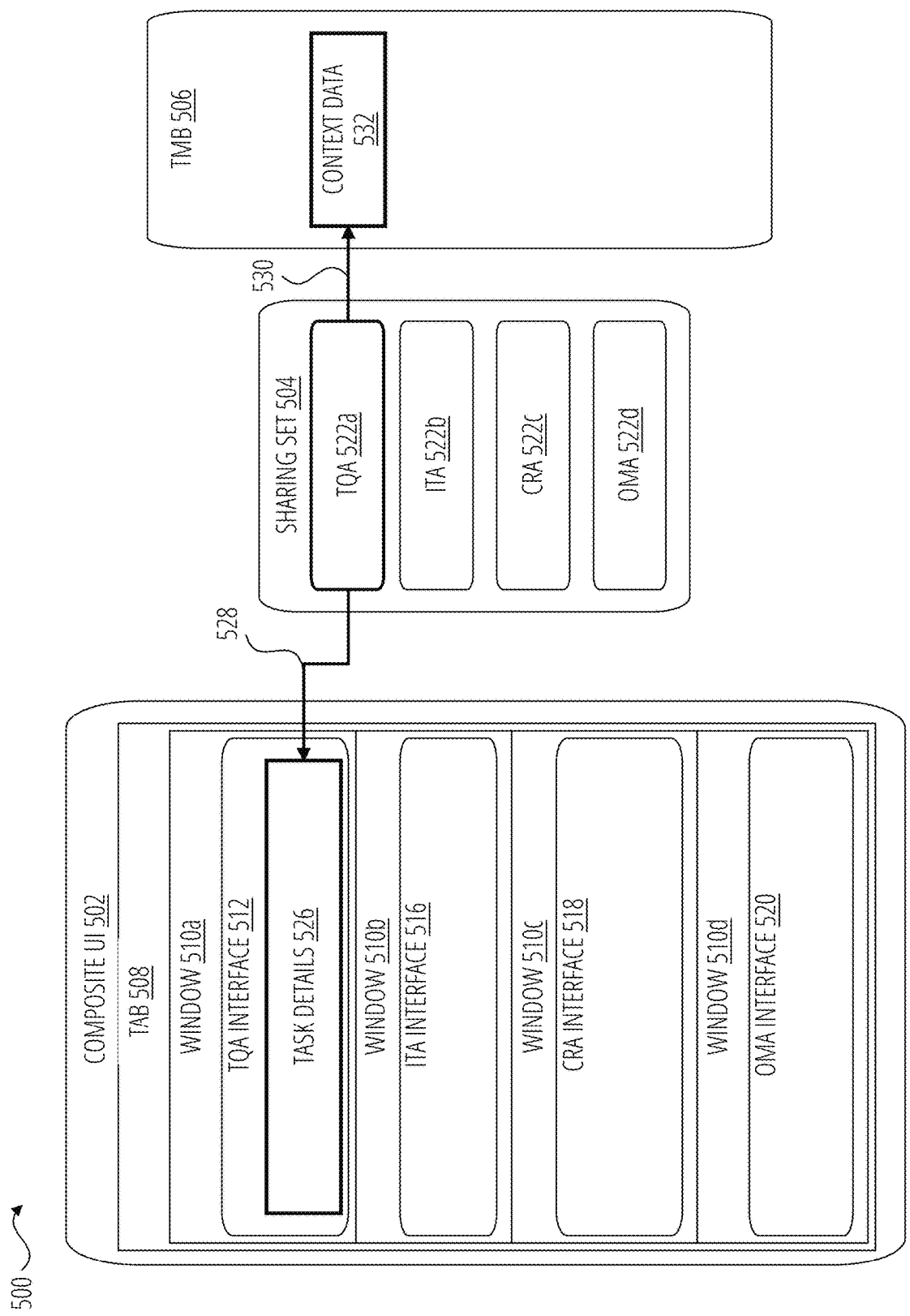
Figure 5C:
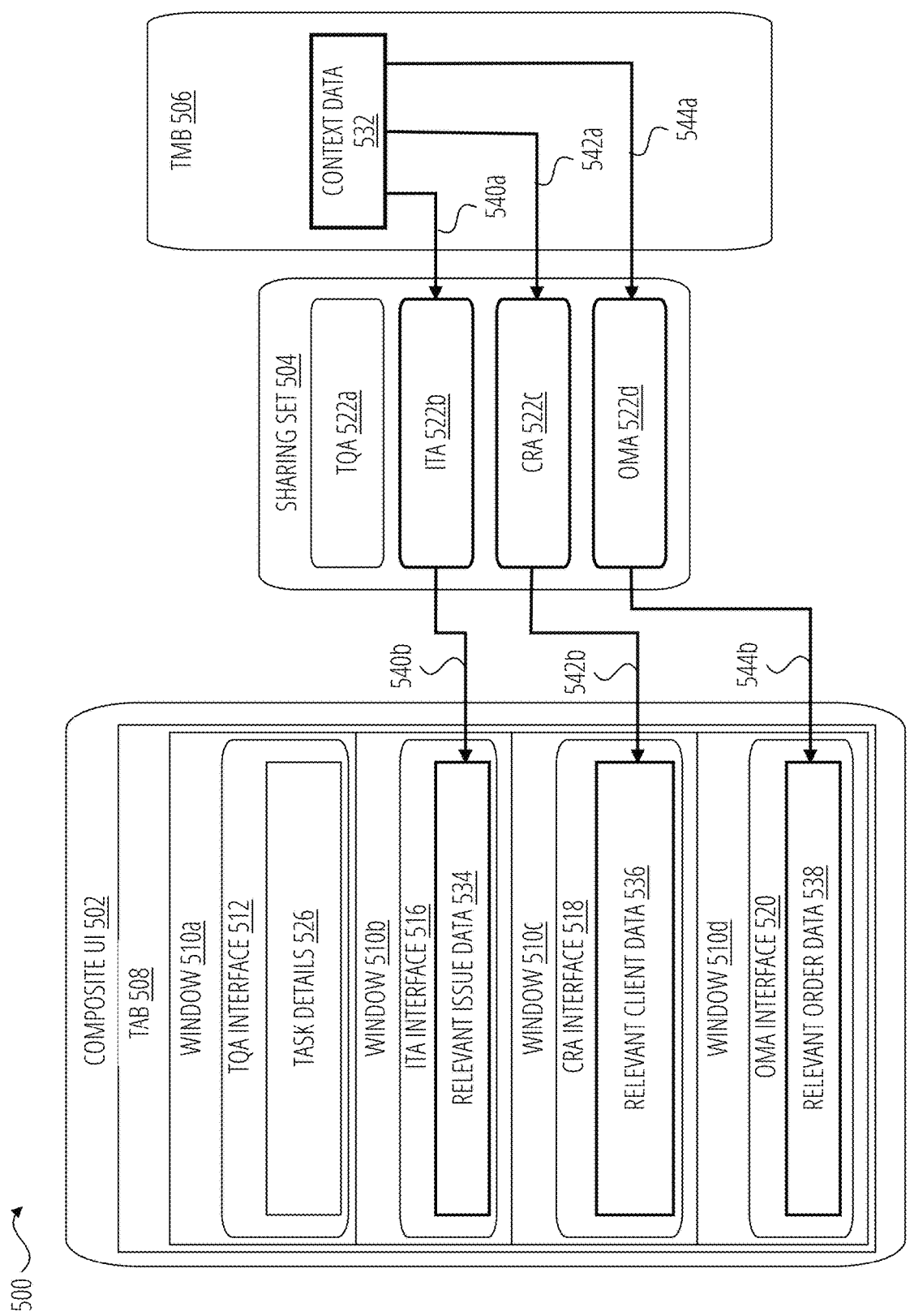

FIGS. 5A-5C illustrate a process flow 500 for sharing contextual data according to some embodiments of the present disclosure. For example, process flow 500 may support dynamic sharing of contextual data amount resources in a sharing set 504. More generally, the process flow 500 may illustrate an exemplary process that a user, such as an employee of a customer service firm, may utilize to perform tasks in an improved and more efficient manner utilizing various techniques disclosed hereby. The illustrated components of FIGS. 5A-5C include composite UI 502, sharing set 504, and TMB 506. The composite UI 502 includes tab 508, windows 510a, 510b, 510c, 510d. The sharing set 504 includes a task queue application (TQA) 522a, an issue tracking application (ITA) 522b, a client relationship application (CRA) 522c, and an order management application (OMA) 522d. Referring back to the composite UI 502, the window 510a includes a TQA interface 512 displaying tasks 514a, 514b, 514c, 514d, the window 510b includes an ITA interface 516, the window 510c includes a CRA interface 518, and the window 510d includes an OMA interface 520. One or more components of FIGS. 5A-5C may be the same or similar to one or more other components disclosed hereby. For example, sharing set 504 may be the same or similar to sharing set 404c. In another example, composite UI 502 may be the same or similar to composite UI 201. Further, aspects discussed with respect to various components in FIGS. 5A-5C may be implemented by one or more other components from one or more other embodiments without departing from the scope of this disclosure. For example, one or more of processes 524, 528, 530, 540a, 540b, process 542a, process 542b, process 544a, process 544b may be implemented by RIA 304 without departing from the scope of this disclosure. Embodiments are not limited in this context.

Referring to FIG. 5A, process flow 500 may begin with a user selecting task 514d from the TQA interface 512. For example, the TQA interface 512 may include a plurality of customer-service related tasks, such as customer complaint resolution tasks, for the user to perform. The TQA 522a may be utilized to record and track these tasks. In response to selecting task 514a via TQA interface 512, the TQA 522a in sharing set 504 may be notified at process 524. In other embodiments, components of the RIA may be notified, such as sharing administrator 316. More generally, in other embodiments, components of the RIA, such as sharing administrator 316, may be responsible for one or more aspects of identifying, publishing, receiving, distributing, etc. of the contextual data. However, for clarity, the description of process flow 500 refers to the application itself performing these aspects.

Referring to FIG. 5B, in response to the notification, TQA 522a may retrieve and present task details 526 associated with task 514d in the TQA interface 512 at process 528. Additionally, TQA 522a may publish context data 532 associated with the selection of task 514d to TMB 506 at process 530. In various embodiments, the context data 532 may include one or more portions of the task details 526. For example, context data 532 may include one or more identified associated with a customer corresponding to the task 514d.

Referring to FIG. 5C, the ITA 522b may be receive or retrieve (e.g., in response to a notification) one or more portions of the context data 532 at process 540a. The ITA 522b may utilize the one or more portions of the context data 532 to retrieve and present relevant issue data 534 in ITA interface 516 at process 540b. For example, relevant issue data 534 may include details surrounding the customer complaint. Further, the CRA 522c may receive or retrieve (e.g., in response to a notification) one or more portions of the context data 532 at process 542a. The CRA 522c may utilize the one or more portions of the context data 532 to retrieve and present relevant client data 536 in CRA interface 518 at process 542b. For example, relevant client data 536 may include contact information for the customer associated with the complaint. Furthermore, the OMA 522d may receive or retrieve (e.g., in response to a notification) one or more portions of the context data 532 at process 544a. The OMA 522d may utilize the one or more portions of the context data 532 to retrieve and present relevant order data 538 in OMA interface 520 at process 544b. For example, relevant client data 536 may include order information associated with the customer complaint. In these and other ways, the user is quickly and efficiently presented with data needed to effectively resolve the customer complaint. It will be appreciated that these applications are merely exemplary of resources that may be utilized and do not limit the scope of this disclosure.

In some embodiments, a daisy chain of process may occur. For example, presentation of the relevant issue data 534 via composite UI 502 may cause second contextual data to be posted to TMB 506 and the CRA 522c may utilize one or more portions of the second contextual data (and/or one or more portions of context data 532) to retrieve and present relevant client data 536. Similarly, presentation of the relevant client data 536 via composite UI 502 may cause third contextual data to be posted to TMB 506 and the OMA 522d may utilize one or more portions of the third contextual data (and/or one or more portions of the second contextual data and/or context data 532) to retrieve and present relevant order data 538.

FIG. 6 is a flow diagram of a method 602 for supporting dynamic context sharing according to some embodiments. Method 602 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 602 may be performed through the execution of RIA 112 by processing device 116 of FIG. 1.

With reference to FIG. 6, method 602 illustrates example functions used by various embodiments. Although specific function blocks ("blocks") are disclosed in method 602, such blocks are examples. That is, embodiments are well suited to performing various other blocks or variations of the blocks recited in method 602. It is appreciated that the blocks in method 602 may be performed in an order different than presented, and that not all of the blocks in method 602 may be performed.

Method 602 begins at block 610, where the processing logic determines UI configuration data for a first view of a composite UI. The first view of the composite UI may include a first UI displayed in a first window and a second UI displayed in a second window. The UI configuration data may indicate the first UI interfaces with a first resource and the second UI interfaces with a second resource. For example, group manager 312 of RIA 304 may determine UI configuration data 322 for a first view of composite UI 302. Further, the UI configuration data 322 may indicate a first resource interface of composite UI 302 interfaces with resource 320*a* and a second resource interface of composite UI 302 interfaces with resource 320*b*.

At block 620, the processing logic generates a sharing set in a context groups mapping based on the UI configuration data. The sharing set may include the first resource and the second resource. For example, group manager 312 of RIA 304 may generate sharing set 318*a* with resource 320*a* and resource 320*b* in context groups mapping 306 based on the UI configuration data 322. Proceeding to block 630, the processing logic shares, via a TMB, contextual data between the first resource and the second resource based on the sharing set. For example, context data 532 may be shared between TQA 522*a* and ITA 522*b* based on the inclusion of TQA 522*a* and 522*b* in sharing set 504.

Figure 7:
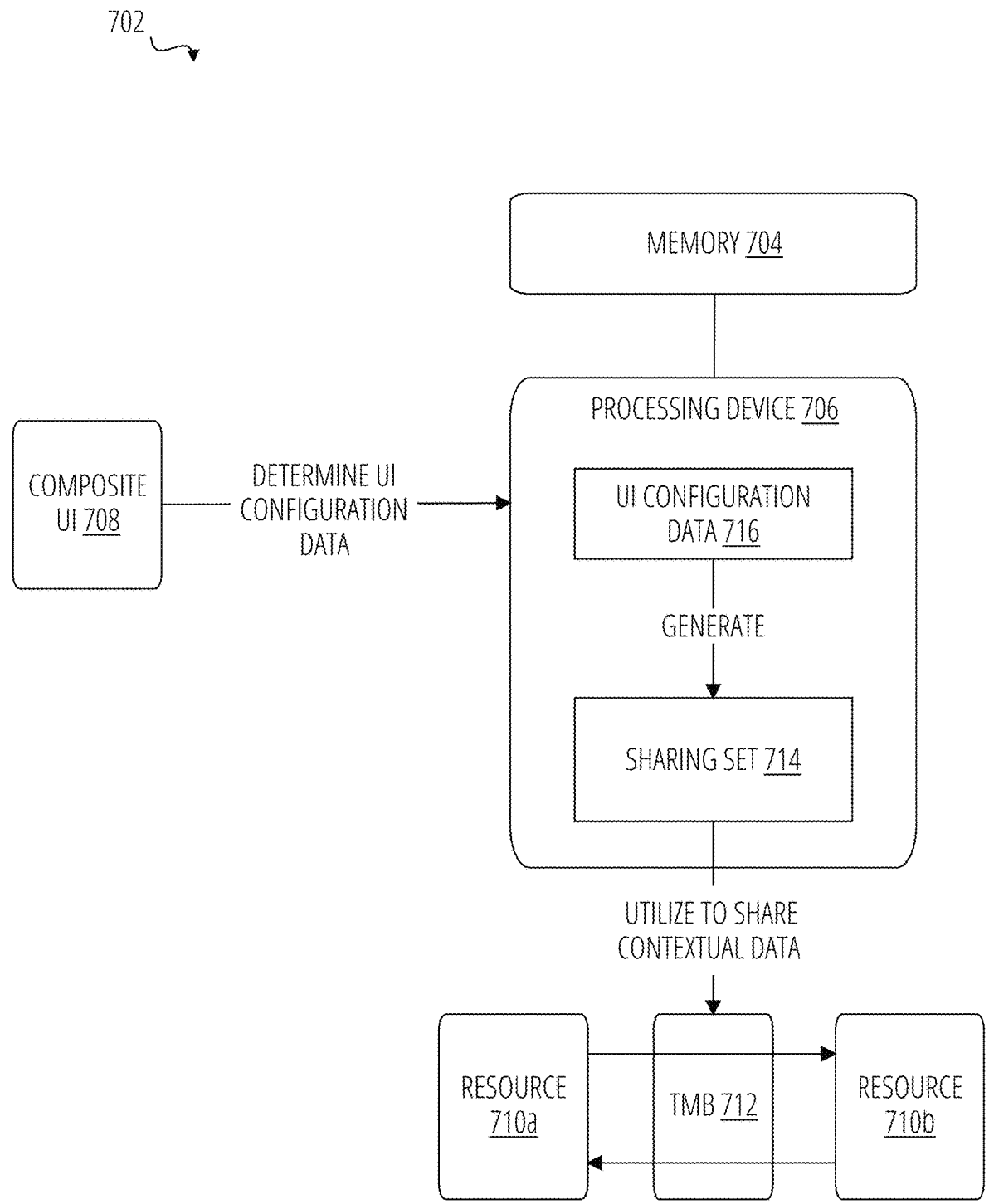
FIG. 7 illustrates a block diagram of an example system for supporting dynamic context sharing according to some embodiments of the present disclosure.

FIG. 7 illustrates a block diagram of a system 702 for supporting dynamic context sharing according to some embodiments. In the illustrated embodiment, system 702 includes a memory 704, a processing device 706, composite UI 708, resource 710*a*, resource 710*b*, and TMB 712. It should be noted that some components of system 702 are shown for illustrative purposes only and are not physical components of the system 702, such as UI configuration data 716 and sharing set 714. One or more components of FIG. 7 may be the same or similar to one or more other components disclosed hereby. For example, processing device 706 may be the same or similar to processing device 116. Further, aspects discussed with respect to various components in FIG. 7 may be implemented by one or more other components from one or more other embodiments without departing from the scope of this disclosure. Embodiments are not limited in this context.

In system 702, the processing device 706 may determine UI configuration data 716, such as based on the contents and layout of composite UI 708. In response to determining the UI configuration data 716, the processing device 706 may generate a sharing set 714. The sharing set 714 may then be utilized to cause contextual data to be shared between resource 710*a* and resource 710*b* via TMB 712.

Figure 8:
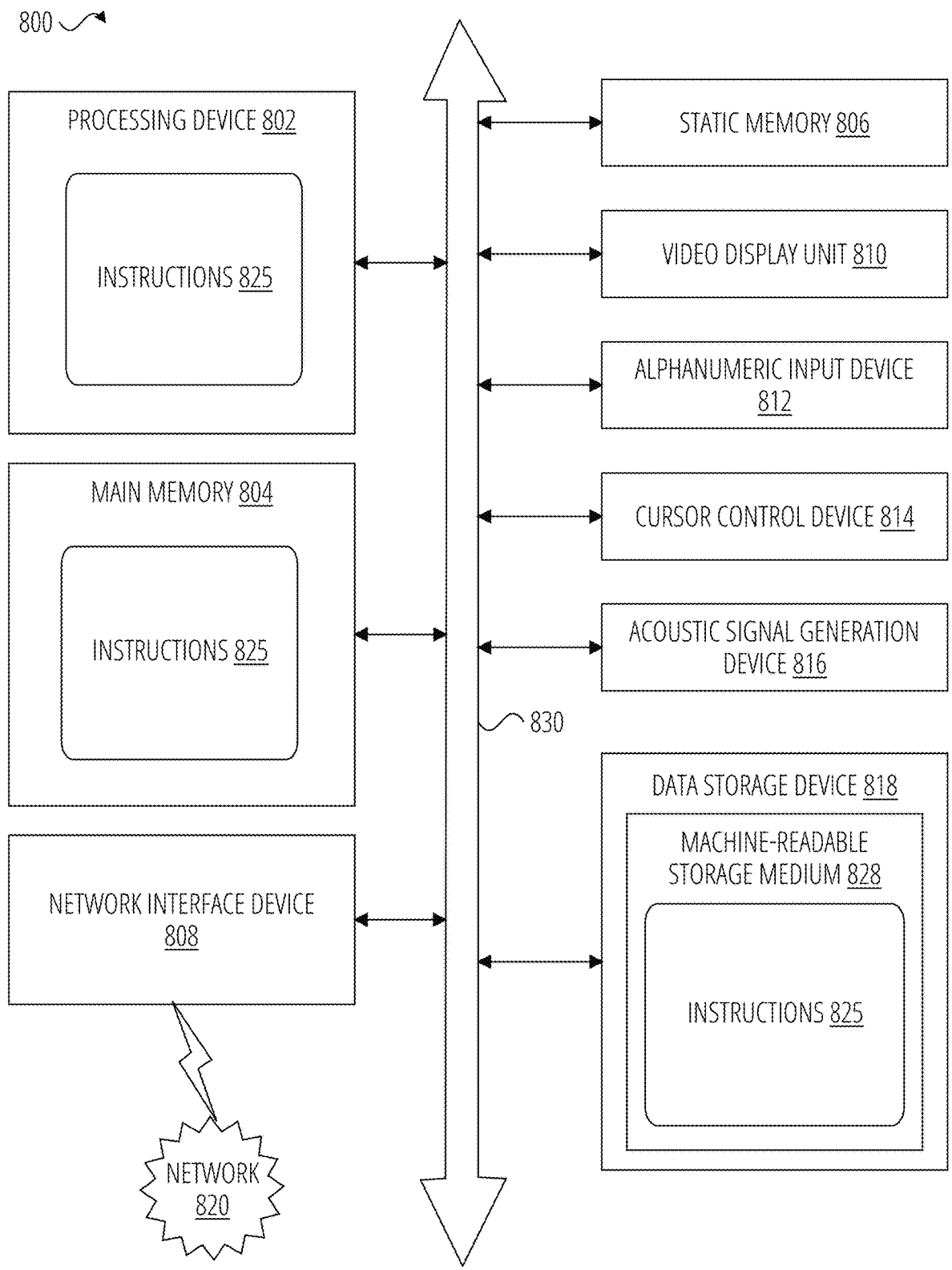
FIG. 8 illustrates a block diagram of an example system according to some embodiments of the present disclosure.

FIG. 8 is a block diagram of an example computing device 800 that may perform one or more of the operations described herein, in accordance with some embodiments of the disclosure. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device 802 (e.g., a general purpose processor, a PLD, etc.), a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also include one or more special-purpose processing devices such as an application specific integrated circuit (ASIC), a field programmable gate array (FPGA), a digital signal processor (DSP), network processor, or the like. The processing device 802 may execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a machine-readable storage medium 828 on which may be stored one or more sets of instructions 825 that may include instructions for a component (e.g., one or more components of RIA 112 and/or TMB 114) for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While machine-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Figure 9:
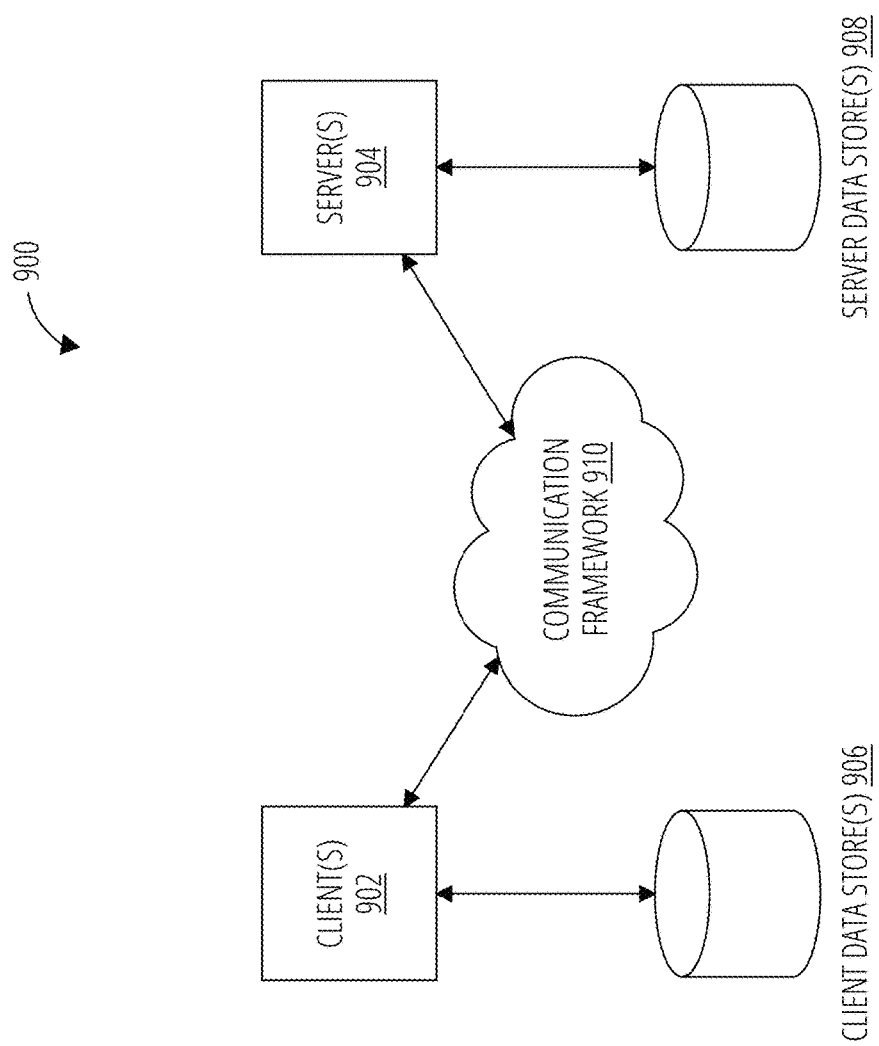
FIG. 9 illustrates exemplary aspects of a communications architecture according to some embodiments of the present disclosure.

FIG. 9 is a block diagram depicting an exemplary communications architecture 900 suitable for implementing various embodiments as previously described, such as communications between resources 106 and computing device 102, for example. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more client(s) 902 and server(s) 904. In some embodiments, each client 902 and/or server 904 may include a computing system (e.g., computing device 800).

The server(s) 904 may implement one or more devices or components of resources 106. The client(s) 902 may implement one or more device or components of computing device 102 or interface device 104. The client(s) 902 and the server(s) 904 are operatively connected to one or more respective client data store(s) 906 and server data store(s) 908 that can be employed to store information local to the respective client(s) 902 and server(s) 904, such as cookies and/or associated contextual information. In various embodiments, any one of server(s) 904 may implement one or more logic flows or operations described hereby, such as in conjunction with storage of data received from any one of client(s) 902 on any of server data store(s) 908. In one or more embodiments, one or more of client data store(s) 906 or server data store(s) 908 may include memory accessible to one or more portions of components, applications, and/or techniques described hereby.

The client(s) 902 and the server(s) 904 may communicate information between each other using a communication framework 910. The communication framework 910 may implement any well-known communications techniques and protocols. The communication framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 902 and the server(s) 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other Unless specifically stated otherwise, terms such as "determining," "generating," "sharing," "publishing", "notifying", "updating", "configuring", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   determining current user interface (UI) configuration data for a first view of a composite UI, the first view of the composite UI comprising a first UI displayed in a first window and a second UI displayed in a second window, and the current UI configuration data indicating the first UI interfaces with a first resource and the second UI interfaces with a second resource;
   generating, by a processing device, a sharing set in a context groups mapping based on the current UI configuration data, the sharing set including the first resource and the second resource;
   sharing, via a trans-resource messaging bus, contextual data between the first resource and the second resource based on the sharing set,
   determining, in response to user input modifying a layout of the first view to produce a second view with a second layout, updated UI configuration data for the second view of the composite UI, the second view of the composite UI comprising the first UI displayed in the first window and a third UI displayed in the second window, and the updated UI configuration data indicating the first UI interfaces with the first resource and the third UI interfaces with a third resource;
   updating, by the processing device, the sharing set to produce an updated sharing set in the context groups mapping based on the updated UI configuration data, wherein the second resource is removed and the third resource is added to produce the updated sharing set; and
   sharing, via the trans-resource messaging bus, contextual data between the first resource and the third resource based on the updated sharing set.

2. The method of claim 1, wherein the contextual data shared between the first resource and the second resource corresponds to content displayed in the first UI or the second UI.

3. The method of claim 1, further comprising populating data in the second UI displayed in the second window based on the contextual data shared between the first resource and the second resource.

4. The method of claim 1, further comprising triggering performance of a process by the second resource based on the contextual data shared between the first resource and the second resource.

5. The method of claim 1, wherein sharing, via the trans-resource messaging bus, the contextual data between the first resource and the second resource comprises:
   publishing a data object to the trans-resource messaging bus; and
   notifying the first resource or the second resource of the data object published to the trans-resource messaging bus.

6. The method of claim 1, further comprising subscribing the first resource or the second resource to an event streaming topic based on the sharing set, wherein events for the event streaming topic are published in the trans-resource messaging bus.

7. The method of claim 1, wherein the first view of the composite UI includes a first tab and a second tab, the first tab includes the first UI displayed in the first window and the second UI displayed in the second window, the second tab includes a fourth UI displayed in a third window and a fifth UI displayed in a fourth window, the current UI configuration data indicates the first UI interfaces with the first resource, the second UI interfaces with the second resource, the fourth UI interfaces with a fourth resource, and the fifth UI interfaces with a fifth resource, and the sharing set comprises a first sharing set, and the method further comprising:
   generating a second sharing set in the context groups mapping based on the current UI configuration data, the second sharing set including the fourth resource and the fifth resource; and
   sharing, via the trans-resource messaging bus, contextual data between the fourth resource and the fifth resource based on the second sharing set.

8. The method of claim 1, wherein the first window of the first view of the composite UI includes a first tab and a second tab, the first tab includes the first UI displayed in the first window, the second tab includes a fourth UI positioned behind the first tab, the current UI configuration data indicates the first UI interfaces with the first resource, the second UI interfaces with the second resource, and the fourth UI interfaces with the fourth resource, and the sharing set in the context groups mapping includes the first resource, the second resource, and the fourth resource, and the method further comprising:
   sharing, via the trans-resource messaging bus, contextual data between the first resource, the second resource, and the fourth resource based on the sharing set.

9. The method of claim 1, further comprising:
   generating at least one of trans-resource messaging bus configuration data or resource configuration data based on the sharing set; and
   configuring at least one of the first resource, the second resource, or the trans-resource messaging bus to share the contextual data between the first resource and the second resource based on at least one of the trans-resource messaging bus configuration data or the resource configuration data.

10. The method of claim 1, wherein the first resource comprises a first application and the second resource comprises a second application.

11. A system comprising:
a memory; and
a processing device, operatively coupled to the memory, to:
  determine current user interface (UI) configuration data for a first view of a composite UI, the first view of the composite UI comprising a first UI displayed in a first window and a second UI displayed in a second window, and the current UI configuration data indicating the first UI interfaces with a first resource and the second UI interfaces with a second resource;
  generate a sharing set in a context groups mapping based on the current UI configuration data, the sharing set including the first resource and the second resource;
  share, via a trans-resource messaging bus, contextual data between the first resource and the second resource based on the sharing set;
  determine, in response to user input modifying a layout of the first view to produce a second view with a second layout, updated UI configuration data for the second view of the composite UI, the second view of the composite UI comprising the first UI displayed in the first window and a third UI displayed in the second window, and the updated UI configuration data indicating the first UI interfaces with the first resource and the third UI interfaces with a third resource;
  update the sharing set to produce an updated sharing set in the context groups mapping based on the updated UI configuration data, wherein the second resource is removed and the third resource is added to produce the updated sharing set; and
  share, via the trans-resource messaging bus, contextual data between the first resource and the third resource based on the updated sharing set.

12. The system of claim 11, wherein the first view of the composite UI includes a first tab and a second tab, the first tab includes the first UI displayed in the first window and the second UI displayed in the second window, the second tab includes a fourth UI displayed in a third window and a fifth UI displayed in a fourth window, the current UI configuration data indicates the first UI interfaces with the first resource, the second UI interfaces with the second resource, the fourth UI interfaces with a fourth resource, and the fifth UI interfaces with a fifth resource, and the sharing set comprises a first sharing set, and the processing device is further to:
  generate a second sharing set in the context groups mapping based on the current UI configuration data, the second sharing set including the fourth resource and the fifth resource; and
  share, via the trans-resource messaging bus, contextual data between the fourth resource and the fifth resource based on the second sharing set.

13. The system of claim 11, wherein the first window of the first view of the composite UI includes a first tab and a second tab, the first tab includes the first UI displayed in the first window, the second tab includes a fourth UI positioned behind the first tab, the current UI configuration data indicates the first UI interfaces with the first resource, the second UI interfaces with the second resource, and the fourth UI interfaces with the fourth resource, and the sharing set in the context groups mapping includes the first resource, the second resource, and the fourth resource, and the processing device is further to:
  share, via the trans-resource messaging bus, contextual data between the first resource, the second resource, and the fourth resource based on the sharing set.

14. The system of claim 11, wherein the processing device is further to:
  generate at least one of trans-resource messaging bus configuration data or resource configuration data based on the sharing set; and
  configure at least one of the first resource, the second resource, or the trans-resource messaging bus to share the contextual data between the first resource and the second resource based on at least one of the trans-resource messaging bus configuration data or the resource configuration data.

15. A non-transitory computer-readable storage medium including instructions that, when executed by a processing device, cause the processing device to:
  Determine current user interface (UI) configuration data for a first view of a composite UI, the first view of the composite UI comprising a first UI displayed in a first window and a second UI displayed in a second window, and the current UI configuration data indicating the first UI interfaces with a first resource and the second UI interfaces with a second resource;
  generate a sharing set in a context groups mapping based on the current UI configuration data, the sharing set including the first resource and the second resource;
  share, via a trans-resource messaging bus, contextual data between the first resource and the second resource based on the sharing set;
  determine, in response to user input modifying a layout of the first view to produce a second view with a second layout, updated UI configuration data for the second view of the composite UI, the second view of the composite UI comprising the first UI displayed in the first window and a third UI displayed in the second window, and the updated UI configuration data indicating the first UI interfaces with the first resource and the third UI interfaces with a third resource;
  update the sharing set to produce an updated sharing set in the context groups mapping based on the updated UI configuration data, wherein the second resource is removed and the third resource is added to produce the updated sharing set; and
  share, via the trans-resource messaging bus, contextual data between the first resource and the third resource based on the updated sharing set.

16. The non-transitory computer-readable storage medium of claim 15, wherein the contextual data shared between the first resource and the second resource corresponds to content displayed in the first UI or the second UI.

17. The non-transitory computer-readable storage medium of claim 15, wherein the processing device is further to populate data in the second UI displayed in the second window based on the contextual data shared between the first resource and the second resource.

18. The non-transitory computer-readable storage medium of claim 15, wherein the processing device is further to trigger performance of a process by the second resource based on the contextual data shared between the first resource and the second resource.

19. The non-transitory computer-readable storage medium of claim 15, wherein sharing, via the trans-resource messaging bus, the contextual data between the first resource and the second resource causes the processing device to:
publish a data object to the trans-resource messaging bus; and
notify the first resource or the second resource of the data object published to the trans-resource messaging bus.

20. The non-transitory computer-readable storage medium of claim 15, wherein the processing device is further to subscribe the first resource or the second resource to an event streaming topic based on the sharing set, wherein events for the event streaming topic are published in the trans-resource messaging bus.

* * * * *